Figure 1:
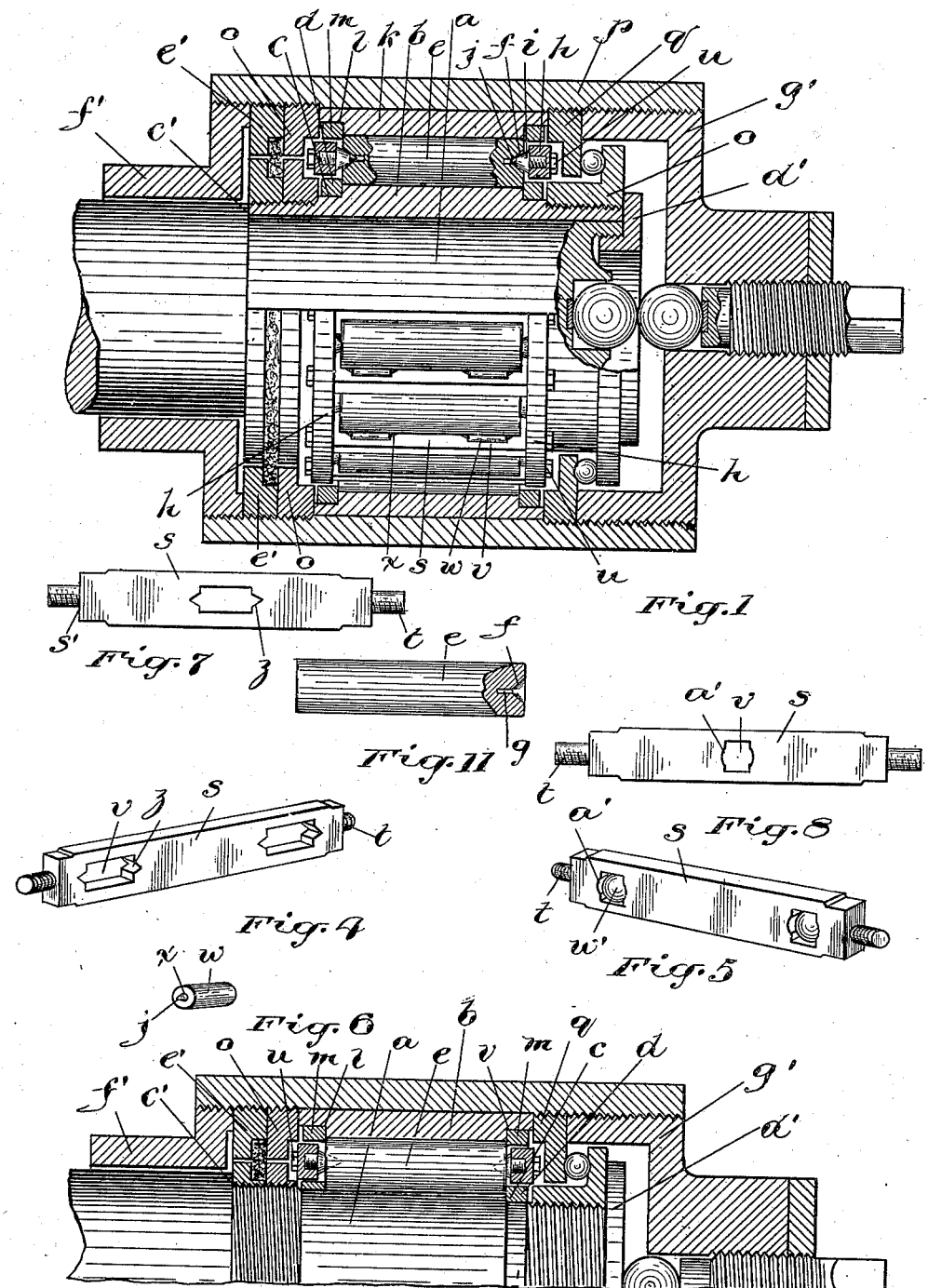

No. 708,475. Patented Sept. 2, 1902.
A. E. HENDERSON.
ROLLER BEARING.
(Application filed Apr. 10, 1902.)
(No Model.) 2 Sheets—Sheet 2.

Witnesses
W. S. Guest
H. Gearing

Inventor
A. E. Henderson
by C. H. Riches
his Attorney

UNITED STATES PATENT OFFICE.

ALBERT E. HENDERSON, OF TORONTO, CANADA.

ROLLER-BEARING.

SPECIFICATION forming part of Letters Patent No. 708,475, dated September 2, 1902.

Application filed April 10, 1902. Serial No. 102,328. (No model.)

*To all whom it may concern:*

Be it known that I, ALBERT ENNIS HENDERSON, of the city of Toronto, in the county of York and Province of Ontario, Canada, have invented certain new and useful Improvements in Roller-Bearings; and I hereby declare that the following is a full, clear, and exact description of the same.

In my application for Letters Patent, Serial No. 69,151, I have shown and described a roller-bearing in which the bearing-rollers are provided with tapering trunnions terminating in conical-shaped points journaled in conical-shaped recesses formed in the inner faces of the retaining-rings, the conical-shaped recesses terminating in horizontally-disposed bores opposed to the conical-shaped points to reduce the frictional contact between the retaining-rings and the tapering trunnions. In the same application the bearing-rings are shown and described as being held against longitudinal displacement by annular and radial abutting shoulders integrally formed with the sleeve and journal or sleeves with which the abutting shoulders unitedly revolve. It has been found by experience that the independent and collective revolution of the bearing-rollers is liable to be arrested by the bearing-rollers under heavy pressure jamming against the abutting shoulders. To obviate this, it is advisable to have the abutting shoulders loosely mounted on the sleeve and journal or sleeves, so that in the event of a jam occurring under heavy pressure or otherwise the abutting shoulders will revolve unitedly with the bearing-rollers until the bearing-rollers shall have been relieved of the jam and continued their normal revolution.

In my application for Letters Patent, Serial No. 93,099, I have shown and described the retaining-rings as held together by apertured tie-rods, in which are contained spacing rollers or balls forming a rolling contact with the bearing-rollers to maintain them in alinement with each other and with the shaft and enable them to resist all torsional strains to which they may be subjected. In this application the spacing-rollers are shown and described as being in frictional contact with the top and bottom of the tie-rod apertures, which prevents them revolving freely on their own axes. In the present application I obviate this frictional contact by providing the ends of the spacing-rollers with tapering trunnions journaled in V-shaped recesses at the middle of the ends of the tie-rod apertures, so that when the spacing-rollers are contained in the apertures they will be held free from contact therewith except as regards the contact of the tapering trunnions and V-shaped recesses.

Figure 2:
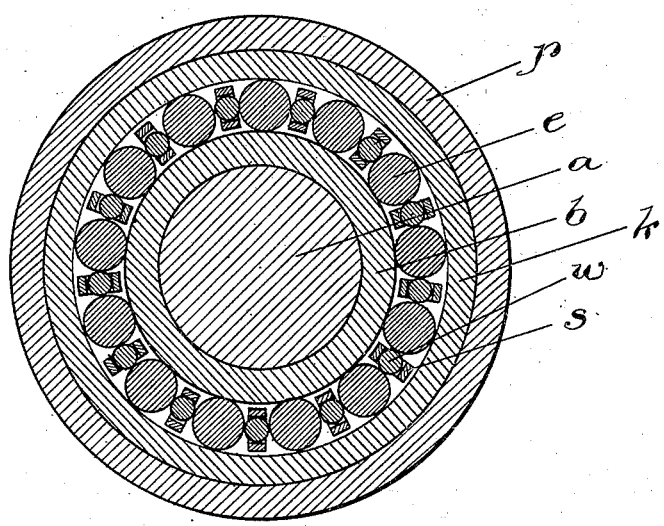
Figures 3, 10:
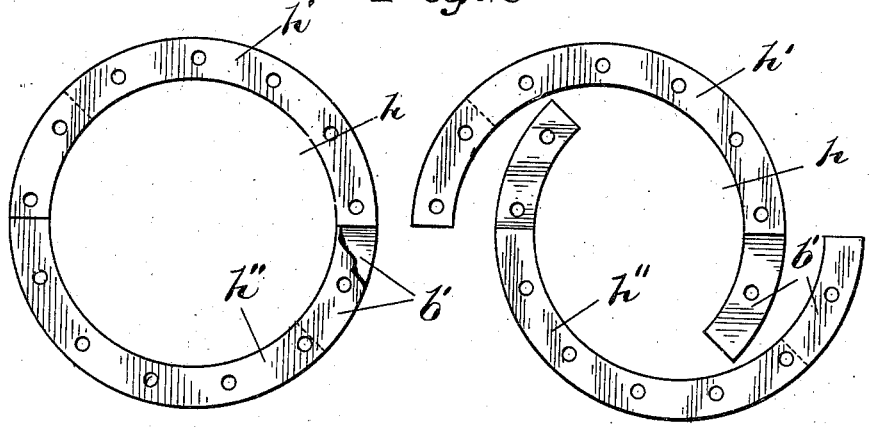

In the drawings, Figure 1 is a sectional view of a roller-bearing, showing the relative position of the parts. Fig. 2 is a cross-sectional view on the lines $a\ a$ of Fig. 1. Fig. 3 is an elevation of one of the retaining-rings, partly in section. Fig. 4 is a perspective view of one of the tie-rods. Fig. 5 is a perspective view of a modification of the tie-rod. Fig. 6 is a perspective view of one of the spacing-rollers. Figs. 7 and 8 are modifications of the tie-rods shown in Figs. 4 and 5. Fig. 9 is a modification of the construction shown in Fig. 1. Fig. 10 is a view of the separate parts of the retaining-rings.

Like letters of reference refer to like parts throughout the specification and drawings.

Loosely mounted on the journal $a$ is a sleeve $b$, in the peripheral face of which are formed circumferential channels $c$, and loosely mounted in the channels $c$ are abutting rings $d$. The ends of the bearing-rollers $e$ are provided with conical recesses $f$, terminating in horizontally-disposed bores $g$. Opposed to the ends of the bearing-rollers $e$ are the bands of the retaining-rings $h$, fitted with tapering pins $i$, having conical points $j$, journaled in the conical recesses $f$ of the bearing-rollers $e$. Inclosing the bearing-rollers $e$ is a sleeve $k$, having annular recesses or channels $l$ in its inner face registering with the recesses or channels $c$ in the peripheral face of the sleeve $b$. Contained in the recesses or channels $l$ are abutting rings $m$, opposed to the abutting rings $d$ and alining therewith. When the retaining-rings and bearing-rollers are assembled on the journal, the abutting rings partially overlap and engage the ends of the bearing-rollers to prevent the longitudinal displacement of the same. Inclosing the sleeve $k$ is a hub or boxing $p$, the internal face of which is screw-threaded beyond the ends of the sleeve $k$, and fitted on the screw-threaded ends of the sleeve $b$ and into the screw-threaded ends of the hub or boxing $p$ are adjusting-nuts $o$ and $q$, respectively, to engage the outer faces of the abutting rings. The bearing-rollers $e$ during their revolution engage the inner faces of the abutting rings $d$ and $m$, which being rigidly locked against longitudinal displacement by the adjusting-nuts $o$ and $q$ prevent the longitudinal displacement of the bearing-rollers. In the event of the bearing-rollers under heavy pressure thrusting or jamming against the abutting rings the abutting rings will revolve unitedly with the bearing-rollers until relieved of the jamming pressure. By means of this construction I am able to obviate the liability of injury either to the bearing-rollers or abutting rings.

Holding the retaining-rings $h$ together are tie-rods $s$, having screw-threaded ends $t$ and abutting shoulders $s'$, the tie-rods being slightly longer than the bearing-rollers, so that the retaining-rings will be held slightly away from the ends of the bearing-rollers when the parts are assembled. The screw-threaded ends $t$ of the tie-rods pass through the retaining-rings $h$ and are fitted on the outer sides of the rings with lock-nuts $u$, which hold the retaining-rings securely against the abutting shoulders $s'$. Formed in the tie-rods $s$ are apertures $v$, in which are contained spacing-rollers $w$ or spacing-balls $w'$, the diameter of the spacing rollers or balls being slightly less than the depth of the apertures and slightly greater than the width of the tie-rods. The ends of the spacing-rollers $w$ are fitted with tapering pins $x$, having conical-shaped points $j$, journaled in V-shaped recesses $z$ at the middle of the ends of the slots $v$, so that the spacing-rollers will be held free from contact with the top or bottom of the apertures in order that there will be no frictional contact between the spacing-rollers and tie-rods. The diameter of the spacing-rollers being greater than the width of the tie-rods, it necessarily follows that the spacing-rollers will project beyond the tie-rods, so as to engage the bearing-rollers and form a rolling contact therewith to hold the bearing-rollers properly spaced under all strains and conditions and enable them to retain their proper relative alinement to each other and to the journal about which they are revolving. In the case of the spacing-balls $w'$ the middle of the apertures $v$ are provided with curved channels $a'$, into which project a portion of the balls when assembled in the apertures, the object of the channels being to hold the balls free from contact with the top and bottom of the aperture. In some cases it is necessary to make each retaining-ring in two separable parts $h'\ h''$, having overlapping joints $b'$. In order to tie the parts together, I find it advisable to have the overlapping joints of a sufficient length to receive the screw-threaded shanks of two or more of the tie-rods, so that the tie-rods will hold the overlapping joints together and rigidly lock them in their relative position to each other and to the bearing-rollers. The inner ends of the sleeves $b$ abut against the shoulder $c'$ of the journal and the outer end against a lock-nut $d'$, fitted into the end of the journal, which not only abuts against the outer end of the sleeve, but also the outer adjusting-nut $o$. Fitted on the inner end of the sleeve $b$ is a lock-nut $e'$, which engages the outer face of the inner adjusting-nut $o$. The adjusting-nuts $q$ are locked in position by lock-nuts $f'\ g'$, fitted into the outer and inner ends, respectively, of the hub or boxing $p$. While I have shown and described the invention as applicable to a specific style of journal and boxing, I wish it understood that it is applicable to all classes of axles and shafts and all styles of hubs and journal-boxes.

Having thus fully described my invention, what I claim as new, and desire to secure by Letters Patent, is—

1. In a roller-bearing the combination of the bearing-rollers, retaining-rings for the bearing-rollers, tie-rods having apertures therein provided with median end grooves, and spacers contained in the apertured tie-rods held from contact therewith by the median end grooves, substantially as specified.

2. In a roller-bearing the combination of the bearing-rollers, retaining-rings for the bearing-rollers, tie-rods having apertures therein provided with median end grooves, and spacing-rollers contained in the apertured tie-rods having tapering pins journaled in the median end grooves, substantially as specified.

3. In a roller-bearing the combination of the bearing-rollers having centrally-located conical recesses in the ends thereof terminating in horizontally-disposed bores, retaining-rings fitted with tapering pins having conical points journaled in the conical recesses of the bearing-rollers, apertured tie-rods for holding the retaining-rings relatively to the bearing-rollers and spacing-rollers contained in the apertured tie-rods, substantially as specified.

4. In a roller-bearing the combination of the bearing-rollers, retaining-rings for the bearing-rollers, tie-rods for holding the retaining-rings together and independently-rotatable abutting rings to contact the ends of the bearing-rollers, substantially as specified.

5. In a roller-bearing the combination of the journal a sleeve therefor, bearing-rollers encircling the sleeve, retaining-rings for the bearing-rollers, tie-rods for holding the retaining-rings together, a sleeve inclosing the retaining-rings, independently-rotatable abutting rings fitted to the sleeves engaging the ends of the bearing-rollers, and adjusting-nuts fitted on the sleeve to prevent the longitudinal displacement of the rotatable abutting rings, substantially as specified.

6. In a roller-bearing the combination of the bearing-rollers, sectional retaining-rings for the bearing-rollers, the separable parts of which have overlapping joints, and a series of tie-rods interposed between the bearing-rollers and passing through the overlapping joints of the retaining-rings to hold the sections of the retaining-rings relatively to each other, and to the bearing-rollers, said tie-rods being provided with apertures therethrough, and antifriction devices mounted in said apertures and adapted to contact the bearing-rollers.

Toronto, March 19, A. D. 1902.

ALBERT E. HENDERSON.

In presence of—
  C. H. RICHES,
  L. F. BROCK.